(12) United States Patent
Chiang

(10) Patent No.: US 11,719,909 B2
(45) Date of Patent: Aug. 8, 2023

(54) OPTICAL LENS

(71) Applicant: ABILITY ENTERPRISE CO., LTD., New Taipei (TW)

(72) Inventor: Yen-Chen Chiang, New Taipei (TW)

(73) Assignee: ABILITY ENTERPRISE CO., LTD., New Taipei (TW)

( * ) Notice: Subject to any disclaimer, the term of this patent is extended or adjusted under 35 U.S.C. 154(b) by 334 days.

(21) Appl. No.: 16/883,126

(22) Filed: May 26, 2020

(65) Prior Publication Data

US 2021/0026108 A1 Jan. 28, 2021

(30) Foreign Application Priority Data

Jul. 23, 2019 (TW) .................................. 108125965

(51) Int. Cl.
*G02B 9/60* (2006.01)
*G02B 13/00* (2006.01)

(52) U.S. Cl.
CPC ........... *G02B 9/60* (2013.01); *G02B 13/0045* (2013.01)

(58) Field of Classification Search
None
See application file for complete search history.

(56) References Cited

U.S. PATENT DOCUMENTS

| 10,816,757 | B2* | 10/2020 | Chang | H04N 5/2253 |
| 2007/0236811 | A1* | 10/2007 | Mori | G02B 13/006 |
| | | | | 359/770 |
| 2018/0210177 | A1* | 7/2018 | Liu | G02B 13/0045 |

FOREIGN PATENT DOCUMENTS

| CN | 105700115 A | 6/2016 |
| CN | 106886080 A | 6/2017 |
| TW | 201413282 A | 4/2014 |

OTHER PUBLICATIONS

Communication corresponding to Chinese Application No. 201910693782.4 and issued by the China National Intellectual Property Administration dated Nov. 3, 2021, 6 pages.
Chinese Office Action corresponding to Application No. 201910693782.4 and dated Oct. 8, 2022, 8 pages.
Taiwan Office Action corresponding to Application No. 108125965 and dated Apr. 10, 2023, 4 pages.

* cited by examiner

*Primary Examiner* — Darryl J Collins
(74) *Attorney, Agent, or Firm* — Innovation Counsel LLP

(57) ABSTRACT

An optical lens, in order from an object side to an image-forming side, includes: a first lens having negative refractive power, a second lens having positive refractive power, a third lens having positive refractive power, a fourth lens having refractive power, and a fifth lens having refractive power. The fourth lens may be positive refractive power, or the fourth lens may have a fourth object-side surface which curves toward the image-forming side. The fifth lens may be negative refractive power, and a spacing may be between the fourth lens and the fifth lens.

17 Claims, 7 Drawing Sheets

| Lens | Surface number | Curvature radius (mm) | Thickness (mm) | Refractive index | Abbe number |
|---|---|---|---|---|---|
| L1 | S1 | -69.06 | 0.38 | 1.62 | 63 |
|    | S2 | 2.04 | 0.81 | | |
| L2 | S3 | 2.30 | 1.43 | 2 | 25 |
|    | S4 | 112.42 | 0.29 | | |
|    | St | ∞ | 0.35 | | |
| L3 | S5 | -5.24 | 0.45 | 1.64 | 23 |
|    | S6 | -2.34 | 0.16 | | |
| L4 | S7 | -1.34 | 0.65 | 1.64 | 23 |
|    | S8 | -0.97 | 0.08 | | |
| L5 | S9 | 2.93 | 0.56 | 1.64 | 23 |
|    | S10 | 1.38 | 1.11 | | |
| $C_P$ | S11 | ∞ | 0.40 | 1.52 | 54 |
|    | S12 | ∞ | 0.13 | | |
|    | I | ∞ | | | |

FIG. 4A

| Surface number | S5 | S6 | S7 | S8 | S9 | S10 |
|---|---|---|---|---|---|---|
| K | 1.74 | -2.45 | 0.10 | -0.68 | 0.74 | -8.64 |
| A2 | 0 | 0 | 0 | 0 | 0 | 0 |
| A4 | -6.12E-02 | 5.96E-02 | 2.59E-01 | 1.45E-01 | -2.09E-01 | -1.06E-01 |
| A6 | -2.72E-01 | -1.12E-01 | -3.43E-01 | -1.84E-01 | 8.05E-02 | 3.86E-02 |
| A8 | 3.48E-01 | -8.11E-02 | 3.69E-01 | 1.53E-01 | -1.33E-02 | -1.19E-02 |
| A10 | -4.37E-01 | 1.43E-01 | -1.97E-01 | -7.22E-02 | -6.39E-05 | 2.54E-03 |
| A12 | 1.06E-01 | -2.18E-02 | 7.70E-02 | 2.92E-02 | 2.89E-04 | -4.18E-04 |
| A14 | 4.50E-02 | -9.61E-02 | 2.33E-02 | 1.23E-03 | 2.12E-06 | 8.01E-05 |
| A16 | 1.96E-01 | 7.05E-02 | -2.01E-02 | -1.71E-03 | -6.63E-06 | -8.43E-06 |

FIG. 4B

| Lens | Surface number | Curvature radius (mm) | Thickness (mm) | Refractive index | Abbe number |
|---|---|---|---|---|---|
| L1 | S1 | -17.90 | 0.38 | 1.62 | 63 |
| | S2 | 2.22 | 0.62 | | |
| L2 | S3 | 2.59 | 1.28 | 2.1 | 17 |
| | S4 | -150.11 | 0.34 | | |
| | St | ∞ | 0.40 | | |
| L3 | S5 | -8.43 | 0.46 | 1.64 | 23 |
| | S6 | -2.70 | 0.16 | | |
| L4 | S7 | -1.33 | 0.75 | 1.64 | 23 |
| | S8 | -0.96 | 0.08 | | |
| L5 | S9 | 2.50 | 0.53 | 1.64 | 23 |
| | S10 | 1.25 | 1.17 | | |
| $C_P$ | S11 | ∞ | 0.40 | 1.52 | 54 |
| | S12 | ∞ | 0.13 | | |
| | I | ∞ | 0.00 | | |

FIG. 5A

| Surface number | S5 | S6 | S7 | S8 | S9 | S10 |
|---|---|---|---|---|---|---|
| K | -61.10 | -8.23 | 0.10 | -0.68 | 0.31 | -7.66 |
| A2 | 0 | 0 | 0 | 0 | 0 | 0 |
| A4 | -6.12E-02 | 5.96E-02 | 2.59E-01 | 1.45E-01 | -2.09E-01 | -1.06E-01 |
| A6 | -2.72E-01 | -1.12E-01 | -3.43E-01 | -1.84E-01 | 8.05E-02 | 3.86E-02 |
| A8 | 3.48E-01 | -8.11E-02 | 3.69E-01 | 1.53E-01 | -1.33E-02 | -1.19E-02 |
| A10 | -4.37E-01 | 1.43E-01 | -1.97E-01 | -7.22E-02 | -6.39E-05 | 2.54E-03 |
| A12 | 1.06E-01 | -2.18E-02 | 7.70E-02 | 2.92E-02 | 2.89E-04 | -4.18E-04 |
| A14 | 4.50E-02 | -9.61E-02 | 2.33E-02 | 1.23E-03 | 2.12E-06 | 8.01E-05 |
| A16 | 1.96E-01 | 7.05E-02 | -2.01E-02 | -1.71E-03 | -6.63E-06 | -8.43E-06 |

FIG. 5B

| Lens | Surface number | Curvature radius (mm) | Thickness (mm) | Refractive index | Abbe number |
|---|---|---|---|---|---|
| L1 | S1 | 98.96 | 0.380 | 1.77 | 49 |
|    | S2 | 1.78 | 0.730 | | |
| L2 | S3 | 2.08 | 1.460 | 2.1 | 17 |
|    | S4 | -168.77 | 0.110 | | |
|    | St | ∞ | 0.418 | | |
| L3 | S5 | -4.48 | 0.394 | 1.64 | 23 |
|    | S6 | -1.93 | 0.115 | | |
| L4 | S7 | -1.26 | 0.722 | 1.54 | 56 |
|    | S8 | -1.16 | 0.080 | | |
| L5 | S9 | 2.94 | 0.566 | 1.64 | 23 |
|    | S10 | 1.82 | 0.800 | | |
| C$_P$ | S11 | ∞ | 0.700 | 1.52 | 54 |
|    | S12 | ∞ | 0.125 | | |
|    | I | ∞ | 0.000 | | |

FIG. 6A

| Surface number | S5 | S6 | S7 | S8 | S9 | S10 |
|---|---|---|---|---|---|---|
| K | 16.23 | 2.04 | -0.40 | -0.55 | 0.20 | -12.37 |
| A2 | 0 | 0 | 0 | 0 | 0 | 0 |
| A4 | -8.45E-02 | 9.96E-02 | 3.05E-01 | 1.80E-01 | -1.46E-01 | -7.44E-02 |
| A6 | -8.24E-02 | -1.03E-03 | -2.74E-01 | -1.69E-01 | 6.40E-02 | 2.27E-02 |
| A8 | 6.48E-02 | -4.19E-02 | 4.08E-01 | 1.84E-01 | -1.30E-02 | -4.19E-03 |
| A10 | -1.82E-01 | 1.46E-01 | -2.27E-01 | -8.54E-02 | 1.54E-04 | 2.18E-05 |
| A12 | 3.61E-01 | -1.28E-02 | 2.64E-02 | 1.89E-02 | 3.12E-04 | 1.74E-04 |
| A14 | -5.25E-01 | -4.45E-02 | 1.51E-02 | -1.33E-04 | 5.83E-06 | -2.17E-05 |
| A16 | 5.10E-01 | 3.15E-02 | -3.83E-03 | -6.62E-04 | -1.19E-05 | -1.35E-06 |

FIG. 6B

|  | OL1 | OL2 | OL3 |
|---|---|---|---|
| EFL (mm) | 2.42 | 2.48 | 2.44 |
| Fno | 2.11 | 2.08 | 2.15 |
| TTL (mm) | 6.78 | 6.68 | 6.60 |
| F1 (mm) | -3.25 | -3.22 | -2.39 |
| F2 (mm) | 2.41 | 2.44 | 1.96 |
| F3 (mm) | 6.51 | 6.25 | 5.18 |
| F4 (mm) | 3.42 | 3.19 | 8.05 |
| F5 (mm) | -4.92 | -4.85 | -9.65 |
| F345 (mm) | 4.03 | 3.769 | 5.09 |
| F2/F345 | 0.598 | 0.647 | 0.385 |
| TTL/EFL | 2.8 | 2.69 | 2.7 |
| h (mm) | 1.1 | 1.2 | 1.15 |
| H (mm) | 2.0 | 2.1 | 1.9 |
| h/H | 0.55 | 0.57 | 0.605 |
| R1 (mm) | -69.06 | 17.90 | 98.96 |
| R2 (mm) | 2.04 | 2.22 | 1.78 |
| |R2/R1| | 0.0295 | 0.124 | 0.018 |
| R3 (mm) | 2.30 | 2.59 | 2.08 |
| R4 (mm) | 112.42 | -150.11 | -168.77 |
| |R3/R4| | 0.020 | 0.017 | 0.012 |

FIG. 7

OPTICAL LENS

This application claims the benefit of Taiwan application Serial No. 108125965, filed Jul. 23, 2019, the subject matter of which is incorporated by reference herein in its entirety.

TECHNICAL FIELD

The invention relates in general to an optical lens, and more particularly to an optical lens with compact volume and excellent imaging quality.

BACKGROUND

In recent years, as the application of the image capturing devices has become more and more widespread, the demand for a compact optical lens has also increased. Besides, the requirement for the imaging quality of the optical lens in the market has become higher and higher as well. In order to be more competitive in the market, miniaturization, high definition and low cost have always been the goals for product development.

Therefore, it is in need to provide a novel optical lens to achieve an optical lens with miniaturized size and improved image quality at the same time in the condition of low manufacturing cost.

SUMMARY

The invention is directed to an optical lens. In the condition of low manufacturing cost, the optical lens with miniaturized size and improved image quality at the same time is achieved.

According to one embodiment, an optical lens is provided. The optical lens, in order from an object side to an image-forming side, includes: a first lens having negative refractive power, a second lens having positive refractive power, a third lens having positive refractive power, a fourth lens having positive refractive power, and a fifth lens having negative refractive power.

According to another embodiment, an optical lens is provided. The optical lens, in order from an object side to an image-forming side, includes: a first lens having negative refractive power, a second lens having positive refractive power, a third lens having positive refractive power, a fourth lens, and a fifth lens having negative refractive power. The fourth lens has a fourth object-side surface recessing toward the image-forming side.

According to still another embodiment, an optical lens is provided. The optical lens, in order from an object side to an image-forming side, includes: a first lens having negative refractive power, a second lens having positive refractive power, a third lens having positive refractive power, a fourth lens having positive refractive power, and a fifth lens having refractive power. A spacing is between the fourth lens and the fifth lens.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 4A lists each lens parameter of the optical lens of FIG. 1 according to one embodiment of the present invention.

FIG. 4B lists aspheric coefficients of the mathematic equation of the aspheric lenses of the optical lens of FIG. 1 according to one embodiment of the present invention.

FIG. 5A lists each lens parameter of the optical lens of FIG. 2 according to another embodiment of the present invention.

FIG. 5B lists aspheric coefficients of the mathematic equation of the aspheric lenses of the optical lens of FIG. 2 according to another embodiment of the present invention.

FIG. 6A lists each lens parameter of the optical lens of FIG. 3 according to still another embodiment of the present invention.

FIG. 6B lists aspheric coefficients of the mathematic equation of the aspheric lenses of the optical lens of FIG. 3 according to still another embodiment of the present invention.

FIG. 7 lists optical information of the optical lenses of FIGS. 4A, 5A, and 6A.

DETAILED DESCRIPTION

Figure 1:
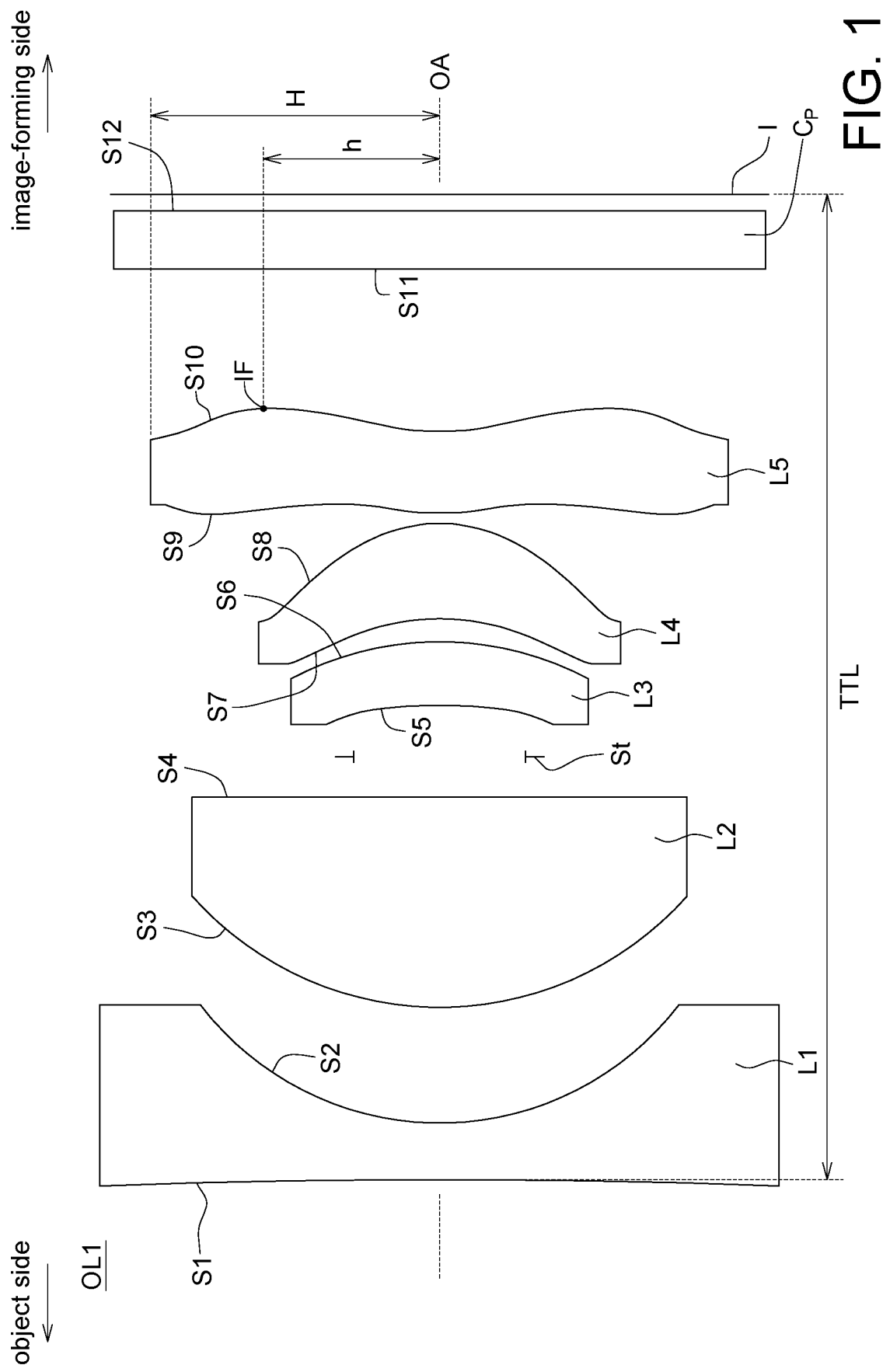
FIG. 1 shows an optical lens according to one embodiment of the present invention.

The embodiments of the present invention are described in details with reference to the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known components and process operations are not described in detail in order not to unnecessarily obscure the present invention. Identical or similar elements of the embodiments are designated with the same or similar reference numerals. While drawings are illustrated in details, it is appreciated that the quantity or sizes of the disclosed components may be greater or less than that disclosed, except expressly restricting the amount or the sizes of the components.

Figure 2:
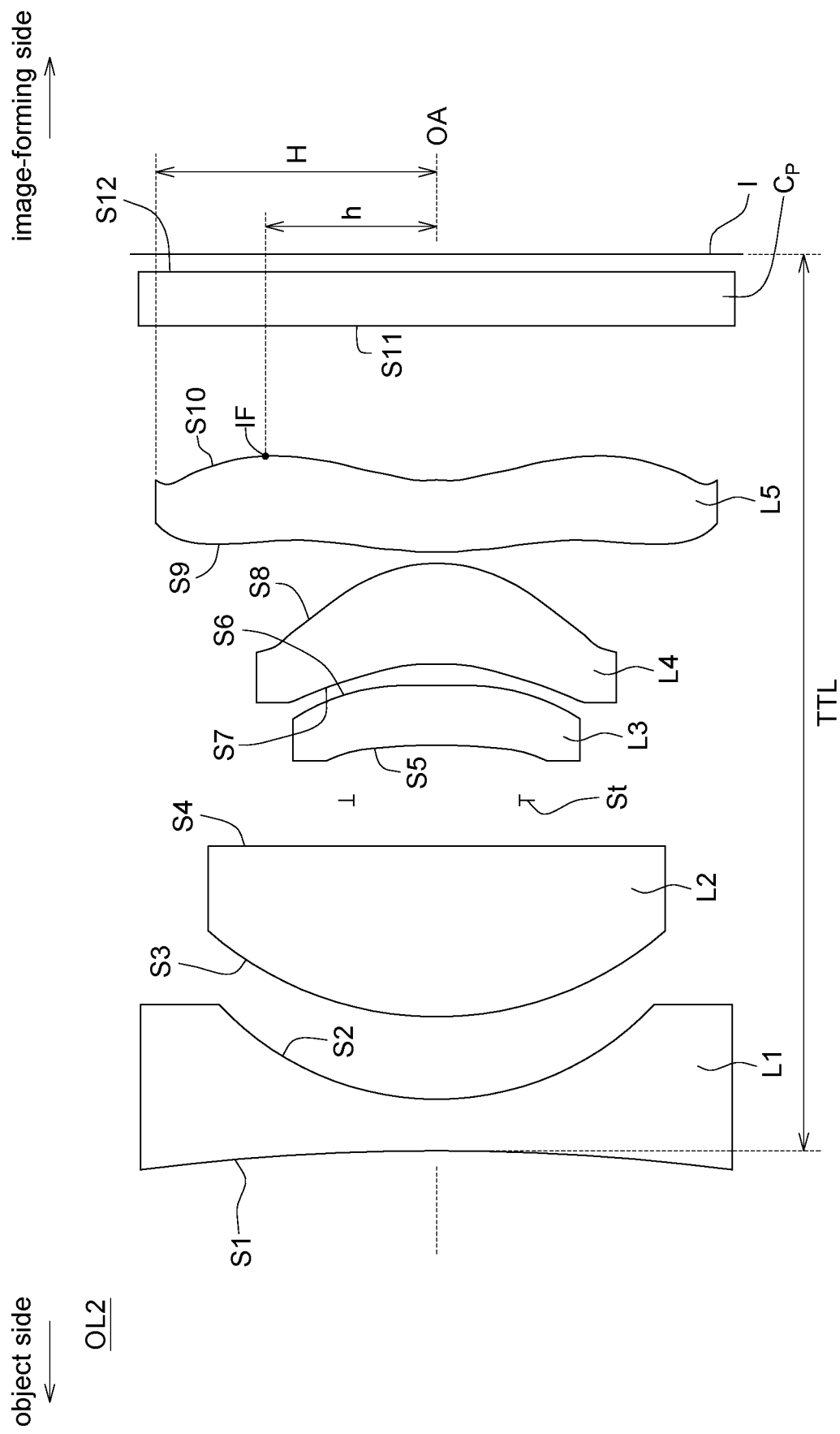
FIG. 2 shows an optical lens according to another embodiment of the present invention.
Figure 3:
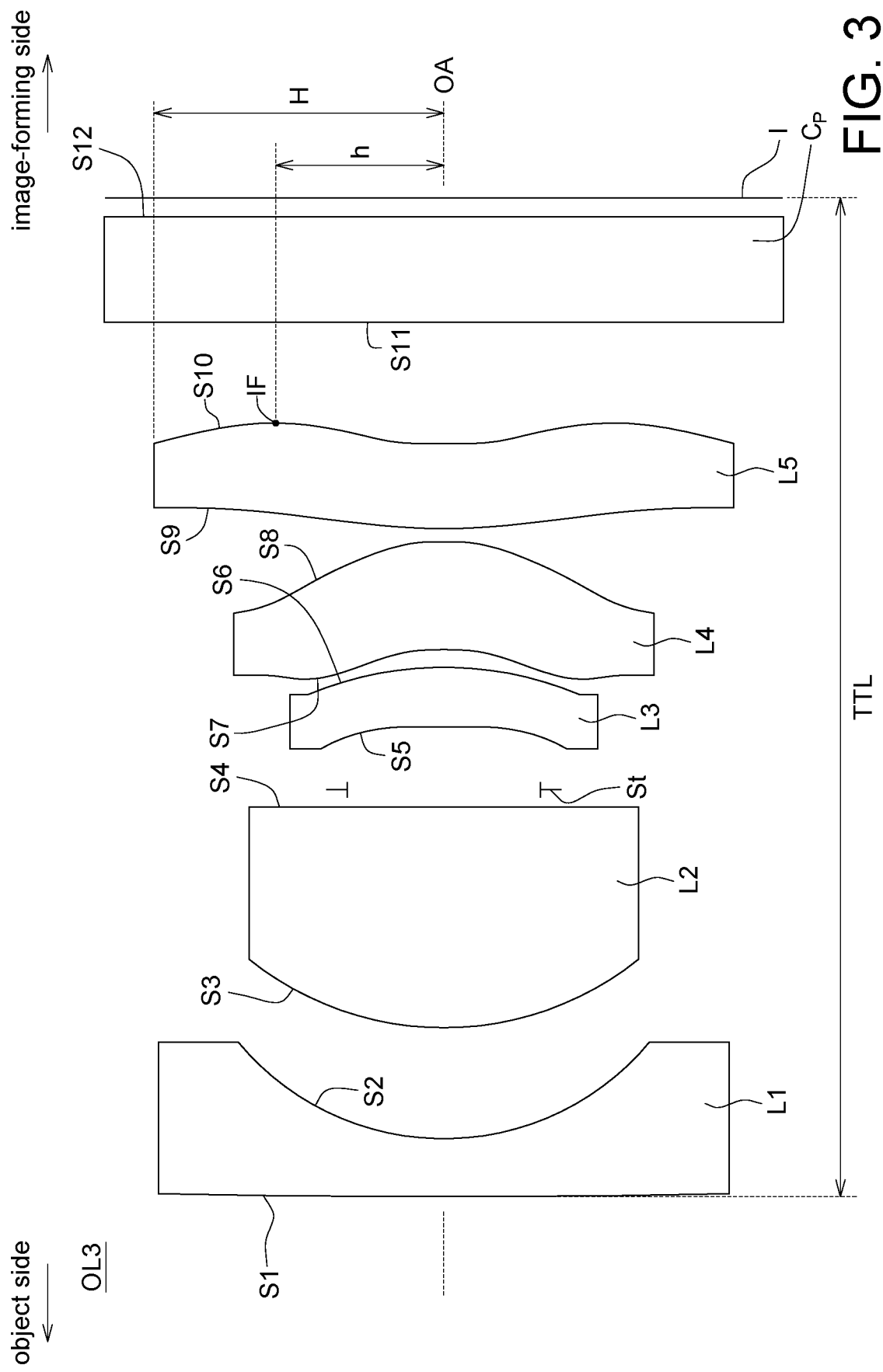
FIG. 3 shows an optical lens according to still another embodiment of the present invention.

FIG. 1 shows an optical lens OL1 according to one embodiment of the present invention. FIG. 2 shows an optical lens OL2 according to another embodiment of the present invention. FIG. 3 shows an optical lens OL3 according to still another embodiment of the present invention. To show the features of the present embodiment, only the structure related to the present embodiment is shown, and the rest of the structure is omitted. The optical lenses OL1, OL2 and OL3 may be applied to a device capable of image projection or image capture, the device including but not limited to a handheld computer system, a handheld communication system, an aerial camera, a sports camera lens, a camera lens for vehicle, a surveillance system, a digital camera, a digital video camera or a projector.

Referring to FIG. 1, FIG. 2 and FIG. 3, the optical lenses OL1, OL2 and OL3, in order from an object side to an image-forming side, may include a first lens L1, a second lens L2, a third lens L3, a fourth lens L4 and a fifth lens L5.

The first lens L1, the second lens L2, the third lens L3, the fourth lens L4 and the fifth lens L5 may be arranged along an optical axis OA.

In some embodiments, the first lens L1 may have negative refractive power; the second lens L2 may have positive refractive power; the third lens L3 may have positive refractive power; the fourth lens L4 may have refractive power, such as positive refractive power; the fifth lens L5 may have refractive power, such as negative refractive power.

In some embodiments, TTL is a distance between an object-side surface S1 of the first lens L1 and an imaging plane I, EFL is a focal length of the optical lenses OL1, OL2, OL3. The optical lenses OL1, OL2, OL3 may satisfy at least one of the following conditions: 1.5≤TTL/EFL, 2≤TTL/EFL, 2.5≤TTL/EFL, TTL/EFL≤3, TTL/EFL≤3.5 and TTL/EFL≤4.

In some embodiments, F2 is a focal length of the second lens L2, F3 is a focal length of the third lens L3, F4 is a focal length of the fourth lens L4. The optical lenses OL1, OL2, OL3 may satisfy at least one of the following conditions: F3≥F2 and F4≥F2. In some specific embodiments, the optical lenses OL1, OL2, OL3 may further satisfy F4≥F3≥F2 or F3≥F4≥F2.

In some embodiments, F345 is an effective focal length of the third lens L3, the fourth lens L4 and the fifth lens L5. The optical lenses OL1, OL2, OL3 may satisfy at least one of the following conditions: 0.2≤|F2/F345|, 0.25≤|F2/F345|, 0.3≤|F2/F345|, 0.35≤|F2/F345|, |F2/F345|≤0.6, |F2/F345|≤0.7 and |F2/F345|≤0.8.

In some embodiments, a spacing is between the fourth lens L4 and the fifth lens L5.

In some embodiments, R1 is a curvature radius of the object-side surface S1 of the first lens L1, R2 is a curvature radius of an image-side surface S2 of the first lens L1. The optical lenses OL1, OL2, OL3 may satisfy at least one of the following conditions: 0<|R2/R1|, 0.01≤|R2/R1|, 0.015≤|R2/R1|, |R2/R1|≤0.15 and |R2/R1|≤0.2.

In some embodiments, R3 is a curvature radius of an object-side surface S3 of the second lens L2, R4 is a curvature radius of an image-side surface S4 of the second lens L2. The optical lenses OL1, OL2, OL3 may satisfy at least one of the following conditions: 0<|R3/R4|, 0.005≤=|R/R4|, 0.01≤|R3/R4|, |R3/R4|≤0.025 and |R3/R4|≤0.03.

In some embodiments, the first lens L1, the second lens L2, the third lens L3, the fourth lens L4 and the fifth lens L5 may respectively be a spherical lens, a free-form lens or an aspheric lens.

Specifically, each of the free-form lenses has at least one free-form surface; that is, an object-side surface and/or an image-side surface of the free-form lens are/is the free-form surface(s). Each of the aspheric lenses has at least one aspheric surface; that is, an object-side surface and/or an image-side surface of the aspheric lens are/is the aspheric surface(s). And, each of the aspheric surfaces may satisfy the following mathematic equation:

$$Z = \left[\frac{(C \times Y^2)}{1 + \sqrt{1-(K+1)C^2Y^2}}\right] + \sum (A_i \times Y^i)$$

where Z is the coordinate in the direction of the optical axis OA, and the direction in which light propagates is designated as positive; $A_2$, $A_4$, $A_6$, $A_8$, $A_{10}$ and $A_{12}$ are aspheric coefficients; K is coefficient of quadratic surface; C is reciprocal of R (C=1/R); R is the curvature radius; Y is the coordinate in a direction perpendicular to the optical axis OA, in which the upward direction away from the optical axis OA is designated as positive. In addition, each of the parameters or the coefficients of the equation of each of the aspheric lenses may be designated respectively to determine the focal length of each of the aspheric lenses.

In some embodiments, at least one of the first lens L1 to the fifth lens L5 may be a spherical lens or an aspheric lens. In one specific embodiment, the first lens L1 and the second lens L2 are spherical lenses, and the third lens L3, the fourth lens L4 and the fifth lens L5 are aspheric lenses. For example, the first lens L1 and the second lens L2 may be spherical lenses whose object-side surfaces S1, S3 and image-side surfaces S2, S4 are spherical surfaces, and the third lens L3, the fourth lens L4 and the fifth lens L5 may be aspheric lenses whose object-side surfaces S5, S7, S9 and image-side surfaces S6, S8, S10 are aspheric surfaces.

Moreover, in some embodiments, the fifth lens L5 of the optical lenses OL1, OL2, OL3 is an aspheric lens, and its image-side surface S10 is an aspheric surface. The image-side surface S10 of the fifth lens L5 has an inflection point IF. A distance between the inflection point IF and the optical axis OA is h, h including but not limited to the shortest distance or the vertical distance between the inflection point IF and the optical axis OA. A distance between an outer edge of the image-side surface S10 of the fifth lens L5 and the optical axis OA is H, H including but not limited to the radius of the fifth lens L5, or the shortest distance or the vertical distance between the outside diameter of the fifth lens L5 and the optical axis OA, and the optical lenses OL1, OL2, OL3 may satisfy at least one of the following conditions: 0.3≤h/H, 0.4≤h/H, 0.5≤h/H, h/H≤0.62, h/H≤0.7, h/H≤0.75 and h/H≤0.8.

In some embodiments, the first lens L1, the second lens L2, the third lens L3, the fourth lens L4 and the fifth lens L5 may respectively be a glass lens made of a glass material or a plastic lens made of a plastic material. The material of the plastic lens may include, but not limited to, polycarbonate, cyclic olefin copolymer (e.g. APEL), polyester resins (e.g. OKP4 or OKP4HT) and so on, or a mixture and/or a compound material including at least one of the above-mentioned three materials.

For example, at least one of the first lens L1 and the second lens L2 may be a glass lens; in other embodiments, at least one of the third lens L3, the fourth lens L4 and the fifth lens L5 may be a plastic lens. In one specific embodiment, both of the first lens L1 and the second lens L2 are glass lenses, and all of the third lens L3, the fourth lens L4 and the fifth lens L5 are plastic lenses, but the present invention is not limited thereto.

Referring to FIG. 1, FIG. 2 and FIG. 3, in some embodiments, the object-side surface S1 of the first lens L1 may be a concave surface that may almost close to a flat surface but a little bit recesses toward the image-forming side at the optical axis OA, having negative refractive rate, or may be a convex surface that may almost close to a flat surface but a little bit protrudes toward the object side at the optical axis OA, having positive refractive rate; the image-side surface S2 of the first lens L1 may be a concave surface recesses toward the object side, having positive refractive rate. The first lens L1 may be a lens having negative refractive power, the lens including but not limited to any one of a biconcave lens, a convex-concave lens or a plano-concave lens, a glass or plastic lens, and a spherical or aspheric lens having negative refractive power, or a combination thereof.

The object-side surface S3 of the second lens L2 may be a convex surface protruding toward the object side, having positive refractive rate; the image-side surface S4 may be a concave surface that may almost close to a flat surface but recesses toward the object side at the optical axis OA, having positive refractive rate, or may be a convex surface that may almost close to a flat surface but protrudes toward the image-forming side at the optical axis OA, having negative refractive rate. The second lens L2 may be a lens having positive refractive power, the lens including but not limited to any one of a convex-concave lens, a biconvex lens or a convexo-plane lens, a glass or plastic lens, and a spherical or aspheric lens having positive refractive power or negative refractive power, or a combination thereof.

The object-side surface S5 of the third lens L3 may be a concave surface recessing toward the image-forming side, having negative refractive rate; the image-side surface S6 may be a convex surface protruding toward the image-forming side, having negative refractive rate. The third lens L3 may be a lens having positive refractive power, the lens including but not limited to any one of a concave-convex lens, a glass or plastic lens, and a spherical or aspheric lens having positive refractive power, or a combination thereof.

The object-side surface S7 of the fourth lens L4 may be a concave surface recessing toward the image-forming side, having negative refractive rate; the image-side surface S8 may form a convex surface protruding toward the image-forming side, having negative refractive rate. The fourth lens L4 may be a lens having refractive power, the lens including but not limited to any one of a concave-convex lens, a glass or plastic lens, and a spherical or aspheric lens having positive refractive power, or a combination thereof.

The object-side surface S9 of the fifth lens L5 may be a convex surface protruding toward the object side, having positive refractive rate; the image-side surface S10 may be a concave surface that may protrude toward the image-forming side at a location far away from the optical axis OA and recesses toward the object side at a location close to the optical axis OA, having positive refractive rate at the optical axis OA. The fifth lens L5 may be a lens having refractive power, the lens including but not limited to any one of a convex-concave lens, a glass or plastic lens, and a spherical or aspheric lens having negative refractive power, or a combination thereof.

In some embodiments, the optical lenses OL1, OL2, OL3 may further include a stop St; in other embodiments, an image capturing unit (not shown) may be further disposed on the imaging plane I for photo-electrically converting light beams passing through the optical lenses OL1, OL2, OL3. The stop St may be arranged in any interval between any two of the first lens L1 to the fifth lens L5. In one specific embodiment, the stop St is arranged between the second lens L2 and the third lens L3, but the present invention is not limited thereto.

Furthermore, the optical lenses OL1, OL2, OL3 may further include a protection plate Cp. In some specific embodiments, the protection plate Cp may be arranged between the fifth lens L5 and the imaging plane I, and a filter film (not shown) may further be formed on the protection plate Cp.

In some embodiments, the optical lenses OL1, OL2, OL3 may further include a filter plate (not shown), which may be arranged between the fifth lens L5 and the protection plate Cp. In another embodiment, the functions of protecting the image capturing unit and filtering the infrared light may both be integrated into the protection plate Cp.

FIG. 4A lists each lens parameter of the optical lens OL1 of FIG. 1 according to one embodiment of the present invention, including the curvature radius, the thickness, the refractive index, the Abbe number (coefficient of chromatic dispersion), and so on of each of the lenses. The surface numbers of the lenses are sequentially ordered from the object side to the image-forming side. For example, "St" stands for the stop St, "S1" stands for the object-side surface S1 of the first lens L1, "S2" stands for the image-side surface S2 of the first lens L1, ..., "S11" and "S12" respectively stand for the object-side surface S11 and the image-side surface S12 of the protection plate Cp, and so on. In addition, the "thickness" stands for the distance between an indicated surface and an adjacent surface close to the image-forming side. For example, the "thickness" of the object-side surface S1 is the distance between the object-side surface S1 of the first lens L1 and the image-side surface S2 of the first lens L1, the "thickness" of the image-side surface S2 is the distance between the image-side surface S2 of the first lens L1 and the object-side surface S3 of the second lens L2.

FIG. 4B lists aspheric coefficients of the mathematic equation of the aspheric lenses of the optical lens OL1 of FIG. 1 according to one embodiment of the present invention. If the object-side surfaces S5, S7, S9 and the image-side surfaces S6, S8, S10 of the third lens L3, the fourth lens L4 and the fifth lens L5 of the optical lens OL1 are aspheric surfaces, each of the aspheric coefficients for the mathematic equation of the aspheric lenses may be listed as indicated in FIG. 4B.

FIG. 5A lists each lens parameter of the optical lens OL2 of FIG. 2 according to another embodiment of the present invention, the definitions and meanings of which are substantially the same as those of FIG. 4A.

FIG. 5B lists aspheric coefficients of the mathematic equation of the aspheric lenses of the optical lens OL2 of FIG. 2 according to another embodiment of the present invention. If the object-side surfaces S5, S7, S9 and the image-side surfaces S6, S8, S10 of the third lens L3, the fourth lens L4 and the fifth lens L5 of the optical lens OL2 are aspheric surfaces, each of the aspheric coefficients for the mathematic equation of the aspheric lenses may be listed as indicated in FIG. 5B.

FIG. 6A lists each lens parameter of the optical lens OL3 of FIG. 3 according to still another embodiment of the present invention, the definitions and meanings of which are substantially the same as those of FIG. 5A.

FIG. 6B lists aspheric coefficients of the mathematic equation of the aspheric lenses of the optical lens OL3 of FIG. 3 according to still another embodiment of the present invention. If the object-side surfaces S5, S7, S9 and the image-side surfaces S6, S8, S10 of the third lens L3, the fourth lens L4 and the fifth lens L5 of the optical lens OL3 are aspheric surfaces, each of the aspheric coefficients for the mathematic equation of the aspheric lenses may be listed as indicated in FIG. 6B.

FIG. 7 lists optical information of the optical lenses OL1, OL2, OL3 of FIGS. 4A, 5A, and 6A, including the focal length EFL, the f-number Fno, the distance TTL between the object-side surface S1 of the first lens L1 and the imaging plane I, the focal lengths F1-F5 of the first lens L1 to the fifth lens L5, the effective focal length F345 of the third lens L3, the fourth lens L4 and the fifth lens L5, the distance h between the inflection point IF of the fifth lens L5 and the optical axis OA, the distance H between the outer edge of the image-side surface S10 of the fifth lens L5 and the optical axis OA, the curvature radii R1-R4 of the object-side surfaces S1, S3 and the image-side surfaces S2, S4, and the values of the relations for the above parameters.

From the above embodiments, the optical lenses OL1, OL2, OL3 may feature in both miniaturized size and improved image quality at the same time in the condition of low manufacturing cost.

It will be apparent to those skilled in the art that various modifications and variations can be made to the disclosed embodiments. It is intended that the specification and examples be considered as exemplary only, with a true scope of the invention being indicated by the following claims and their equivalents.

What is claimed is:

1. An optical lens, in order from an object side to an image-forming side, comprising:
    a first lens having negative refractive power;
    a second lens having positive refractive power, wherein R3 is a curvature radius of a second object-side surface of the second lens, R4 is a curvature radius of a second image-side surface of the second lens;
    a third lens having positive refractive power;
    a fourth lens having positive refractive power; and
    a fifth lens having negative refractive power, wherein H is a distance between an outer edge of a fifth image-side surface of the fifth lens and an optical axis of the optical lens, the fifth image-side surface has an inflection point, h is a distance between the inflection point and the optical axis, and the optical lens satisfies at least one of the following conditions: 0.3≤h/H≤0.8 and 0<|R3/R4|≤0.03.

2. The optical lens according to claim 1, wherein TTL is a distance between a first object-side surface of the first lens and an imaging plane, EFL is a focal length of the optical lens, and the optical lens satisfies at least one of the following conditions: 1.5≤TTL/EFL and TTL/EFL≤4.

3. The optical lens according to claim 1, wherein the optical lens satisfies at least one of the following conditions:
    the first lens is a biconcave lens, a convex-concave lens or a plano-concave lens;
    the second lens is a convex-concave lens, a biconvex lens or a convexo-plane lens;
    the third lens is a concave-convex lens;
    the fourth lens is a concave-convex lens; and
    the fifth lens is a convex-concave lens.

4. The optical lens according to claim 1, wherein the optical lens satisfies at least one of the following conditions:
    at least one of the first lens and the second lens is a spherical lens; and
    at least one of the third lens, the fourth lens and the fifth lens is an aspheric lens.

5. The optical lens according to claim 1, wherein F2 is a focal length of the second lens, F3 is a focal length of the third lens, F4 is a focal length of the fourth lens, and F345 is an effective focal length of the third lens, the fourth lens and the fifth lens, wherein the optical lens satisfies at least one of the following conditions: F3≥F2, F4≥F2, and 0.2≤|F2/F345|≤0.8.

6. The optical lens according to claim 1, wherein R1 is a curvature radius of a first object-side surface of the first lens, R2 is a curvature radius of a first image-side surface of the first lens, and the optical lens satisfies the following conditions: 0<|R2/R1|≤0.2.

7. An optical lens, in order from an object side to an image-forming side, comprising:
    a first lens having negative refractive power;
    a second lens having positive refractive power, wherein R3 is a curvature radius of a second object-side surface of the second lens, R4 is a curvature radius of a second image-side surface of the second lens;
    a third lens having positive refractive power;
    a fourth lens having a fourth object-side surface recessing toward the image-forming side; and
    a fifth lens having negative refractive power, wherein H is a distance between an outer edge of a fifth image-side surface of the fifth lens and an optical axis of the optical lens, the fifth image-side surface has an inflection point, h is a distance between the inflection point and the optical axis, and the optical lens satisfies at least one of the following conditions: 0.3≤h/H and h/H≤0.8 and 0<|R3/R4|≤0.03.

8. The optical lens according to claim 7, wherein TTL is a distance between a first object-side surface of the first lens and an imaging plane, EFL is a focal length of the optical lens, and the optical lens satisfies at least one of the following conditions: 1.5≤TTL/EFL and TTL/EFL≤4.

9. The optical lens according to claim 7, wherein the optical lens satisfies at least one of the following conditions:
    the first lens is a biconcave lens, a convex-concave lens or a plano-concave lens;
    the second lens is a convex-concave lens, a biconvex lens or a convexo-plane lens;
    the third lens is a concave-convex lens;
    the fourth lens is a concave-convex lens; and
    the fifth lens is a convex-concave lens.

10. The optical lens according to claim 7, wherein the optical lens satisfies at least one of the following conditions:
    at least one of the first lens and the second lens is a spherical lens; and
    at least one of the third lens, the fourth lens and the fifth lens is an aspheric lens.

11. The optical lens according to claim 7, wherein F2 is a focal length of the second lens, F3 is a focal length of the third lens, F4 is a focal length of the fourth lens, and F345 is an effective focal length of the third lens, the fourth lens and the fifth lens, wherein the optical lens satisfies at least one of the following conditions: F3≥F2, F4≥F2, and 0.2≤|F2/F345|≤0.8.

12. The optical lens according to claim 7, wherein R1 is a curvature radius of a first object-side surface of the first lens, R2 is a curvature radius of a first image-side surface of the first lens, and the optical lens satisfies the following conditions: 0<|R2/R1|≤0.2.

13. An optical lens, in order from an object side to an image-forming side, comprising:
    a first lens having negative refractive power;
    a second lens having positive refractive power, wherein R3 is a curvature radius of a second object-side surface of the second lens, R4 is a curvature radius of a second image-side surface of the second lens;
    a third lens having positive refractive power;
    a fourth lens having positive refractive power; and
    a fifth lens having refractive power, and a spacing is between the fourth lens and the fifth lens, wherein H is a distance between an outer edge of a fifth image-side surface of the fifth lens and an optical axis of the optical lens, the fifth image-side surface has an inflection point, h is a distance between the inflection point and the optical axis, and the optical lens satisfies at least one of the following conditions: 0.3≤h/H≤0.8 and 0<|R3/R4|≤0.03.

14. The optical lens according to claim 13, wherein TTL is a distance between a first object-side surface of the first lens and an imaging plane, EFL is a focal length of the optical lens, and the optical lens satisfies at least one of the following conditions: $1.5 \leq TTL/EFL$ and $TTL/EFL \leq 4$.

15. The optical lens according to claim 13, wherein the optical lens satisfies at least one of the following conditions: the first lens is a biconcave lens, a convex-concave lens or a plano-concave lens, the second lens is a convex-concave lens, a biconvex lens or a convexo-plane lens, the third lens is a concave-convex lens, the fourth lens is a concave-convex lens, and the fifth lens is a convex-concave lens.

16. The optical lens according to claim 13, wherein F2 is a focal length of the second lens, F3 is a focal length of the third lens, F4 is a focal length of the fourth lens, and F345 is an effective focal length of the third lens, the fourth lens and the fifth lens, wherein the optical lens satisfies at least one of the following conditions: $F3 \geq F2$, $F4 \geq F2$, and $0.2 \leq |F2/F345| \leq 0.8$.

17. The optical lens according to claim 13, wherein R1 is a curvature radius of a first object-side surface of the first lens, R2 is a curvature radius of a first image-side surface of the first lens, and the optical lens satisfies the following conditions: $0 < |R2/R1| \leq 0.2$.

\* \* \* \* \*